US 12,182,262 B2

(12) United States Patent
Jeong et al.

(10) Patent No.: US 12,182,262 B2
(45) Date of Patent: Dec. 31, 2024

(54) RANDOM NUMBER GENERATOR FOR DEFENDING AGAINST SUBCHANNEL ATTACK, AND OPERATION METHOD THEREOF

(71) Applicant: EYL INC., Yongin-si (KR)

(72) Inventors: Bu Suk Jeong, Gyeonggi-do (KR); Dae Hyun Nam, Seoul (KR); Seong Joon Cho, Seongnam-si (KR); Jung Hyun Baik, Seongnam-si (KR); Tae Jin Lim, Gwangju-si (KR)

(73) Assignee: EYL INC., Yongin-si (KR)

( * ) Notice: Subject to any disclaimer, the term of this patent is extended or adjusted under 35 U.S.C. 154(b) by 219 days.

(21) Appl. No.: 17/782,746

(22) PCT Filed: Dec. 4, 2020

(86) PCT No.: PCT/KR2020/017695
§ 371 (c)(1),
(2) Date: Jun. 6, 2022

(87) PCT Pub. No.: WO2021/112637
PCT Pub. Date: Jun. 10, 2021

(65) Prior Publication Data
US 2023/0004644 A1   Jan. 5, 2023

(30) Foreign Application Priority Data
Dec. 6, 2019 (KR) .................. 10-2019-0161218

(51) Int. Cl.
*G06F 21/55* (2013.01)
*G06F 7/58* (2006.01)

(52) U.S. Cl.
CPC .............. *G06F 21/556* (2013.01); *G06F 7/58* (2013.01); *G06F 2221/034* (2013.01)

(58) Field of Classification Search
CPC .... G06F 21/556; G06F 7/58; G06F 2221/034; G06F 2207/7223; G06F 2207/7266;
(Continued)

(56) References Cited

U.S. PATENT DOCUMENTS 5,309,561 A * 5/1994 Overhouse ............ G06F 13/423
713/375
2010/0308868 A1* 12/2010 Zinke ....................... G06F 1/14
327/143

FOREIGN PATENT DOCUMENTS

JP         2842752 B2    1/1999
KR      1999018451 A    3/1999
(Continued)

OTHER PUBLICATIONS

International Search Report (with English Translation) and Written Opinion (with English Translation) issued on Mar. 6, 2021 in corresponding International Patent Application No. PCT/KR2020/017695; 12 pages.

*Primary Examiner* — Sm A Rahman
(74) *Attorney, Agent, or Firm* — NKL LAW; Byungwoong Park

(57) ABSTRACT

A random number generator resistant to side-channel attacks. The random number generator includes an entropy unit generating random pulses, a random frequency clock generator generating random frequencies by receiving random pulses output from the entropy unit, and an MCU externally masking a specific operation or a specific instruction based on a random frequency received from the random frequency clock generator.

8 Claims, 8 Drawing Sheets

(58) Field of Classification Search
CPC ..... G06F 7/588; H04L 2209/08; H04L 9/003; H04L 2209/04
See application file for complete search history.

(56) References Cited

FOREIGN PATENT DOCUMENTS

| | | |
|---|---|---|
| KR | 1020070022262 A | 2/2007 |
| KR | 1020150026737 A | 3/2015 |
| KR | 101721168 B1 | 3/2017 |
| KR | 2211511 B1 * | 2/2021 |
| WO | 02071204 A1 | 9/2002 |

* cited by examiner

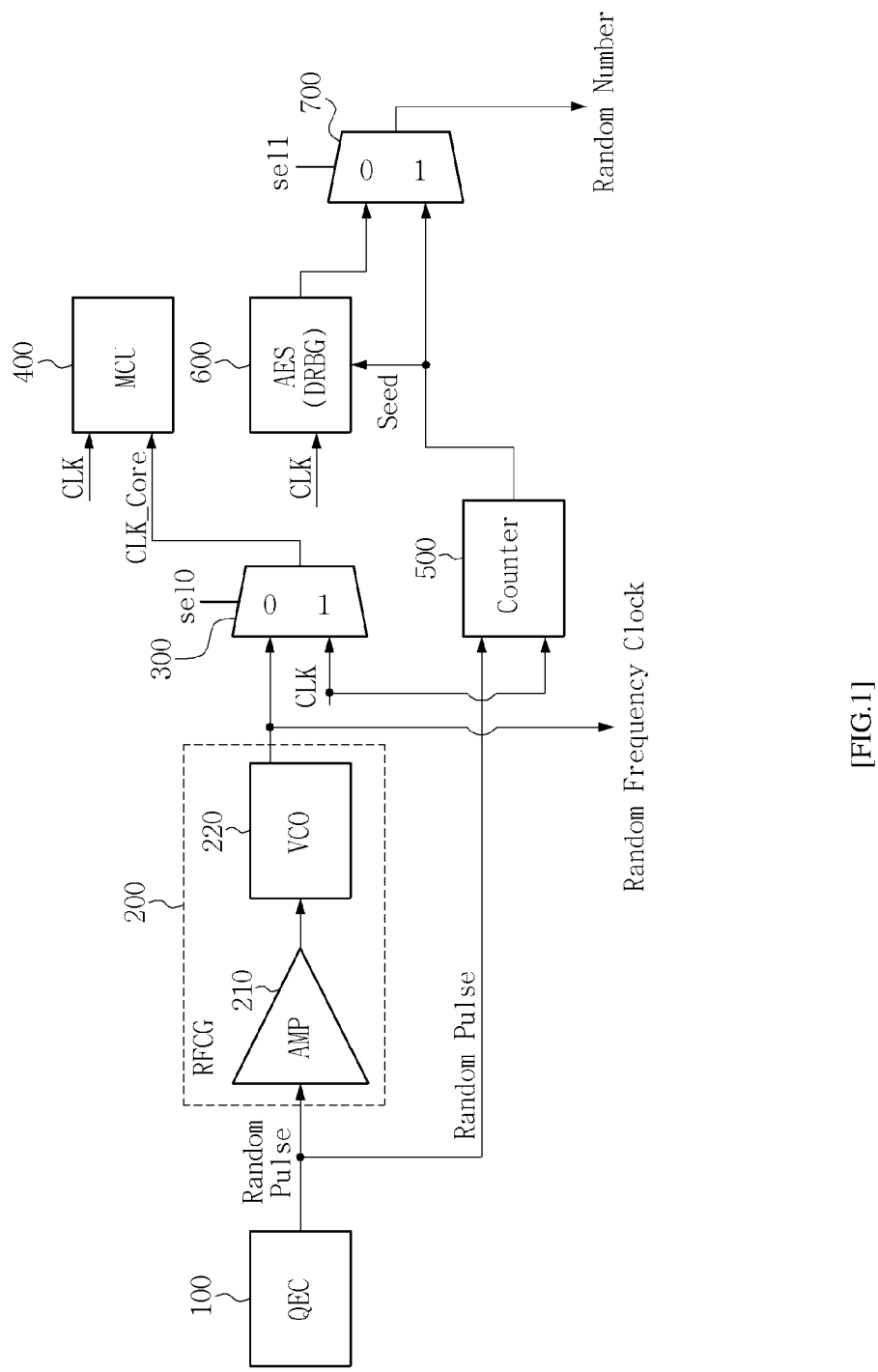
[FIG.1]

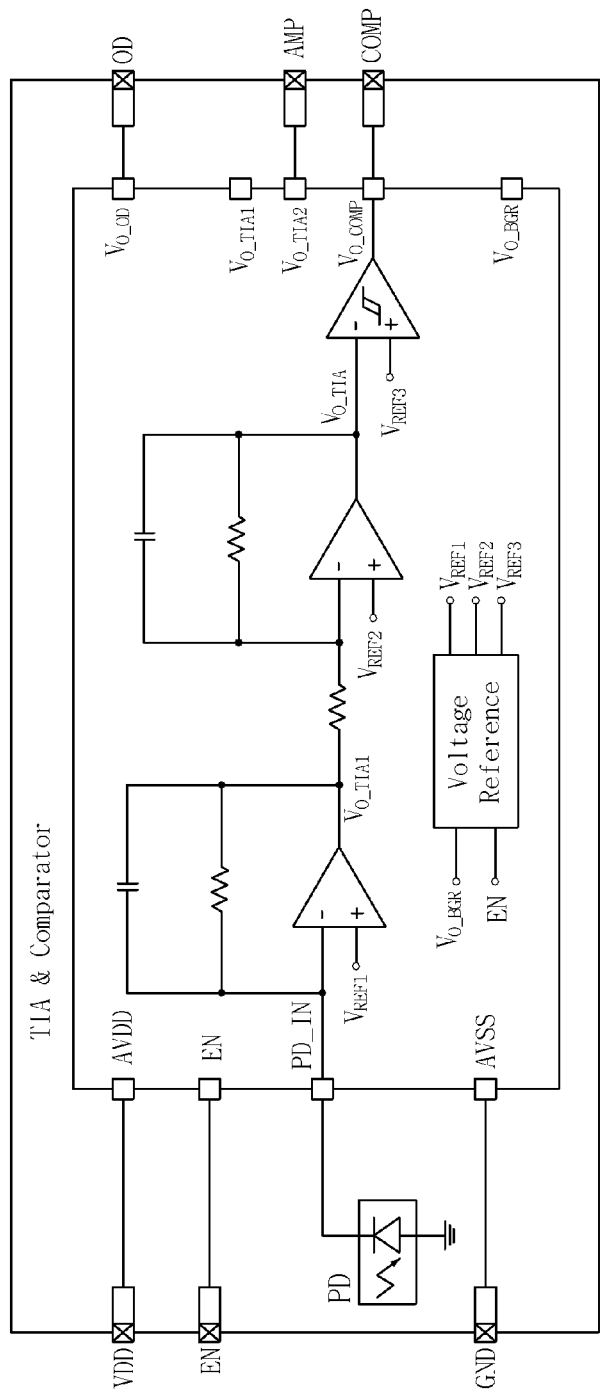
[FIG.2]

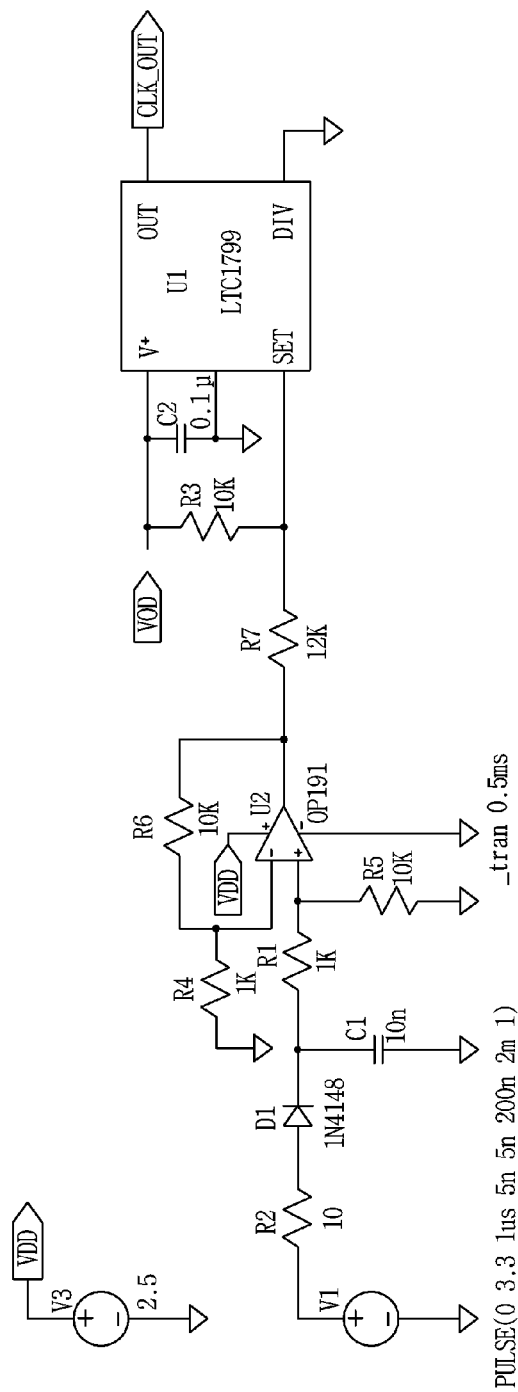
[FIG.3]

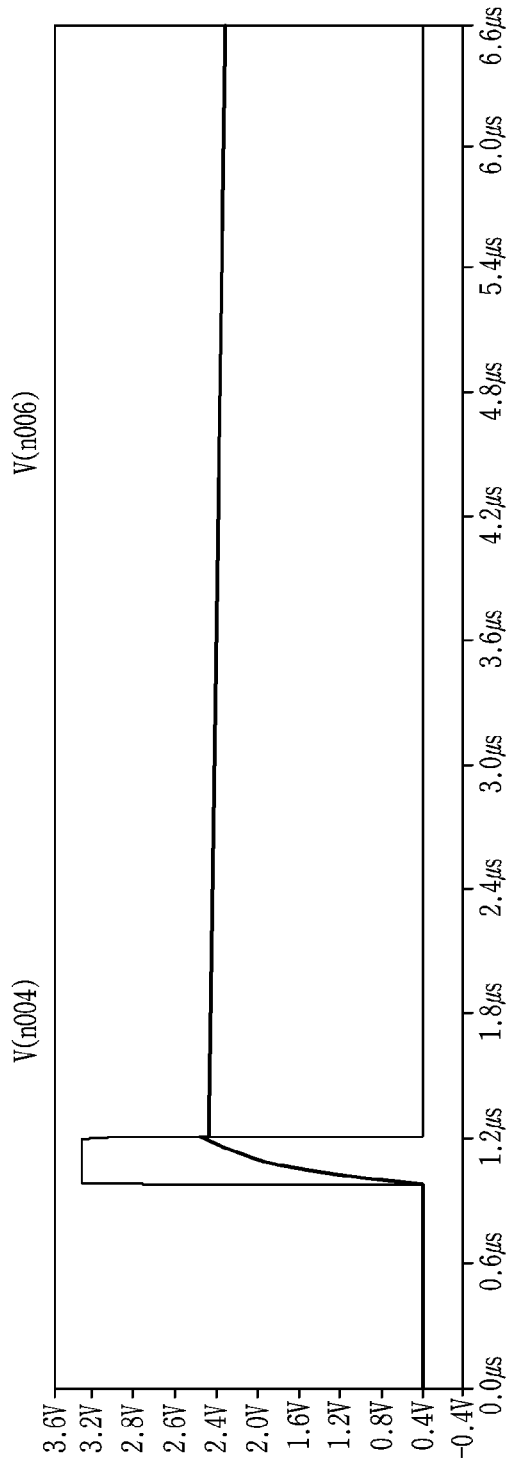
[FIG.4]

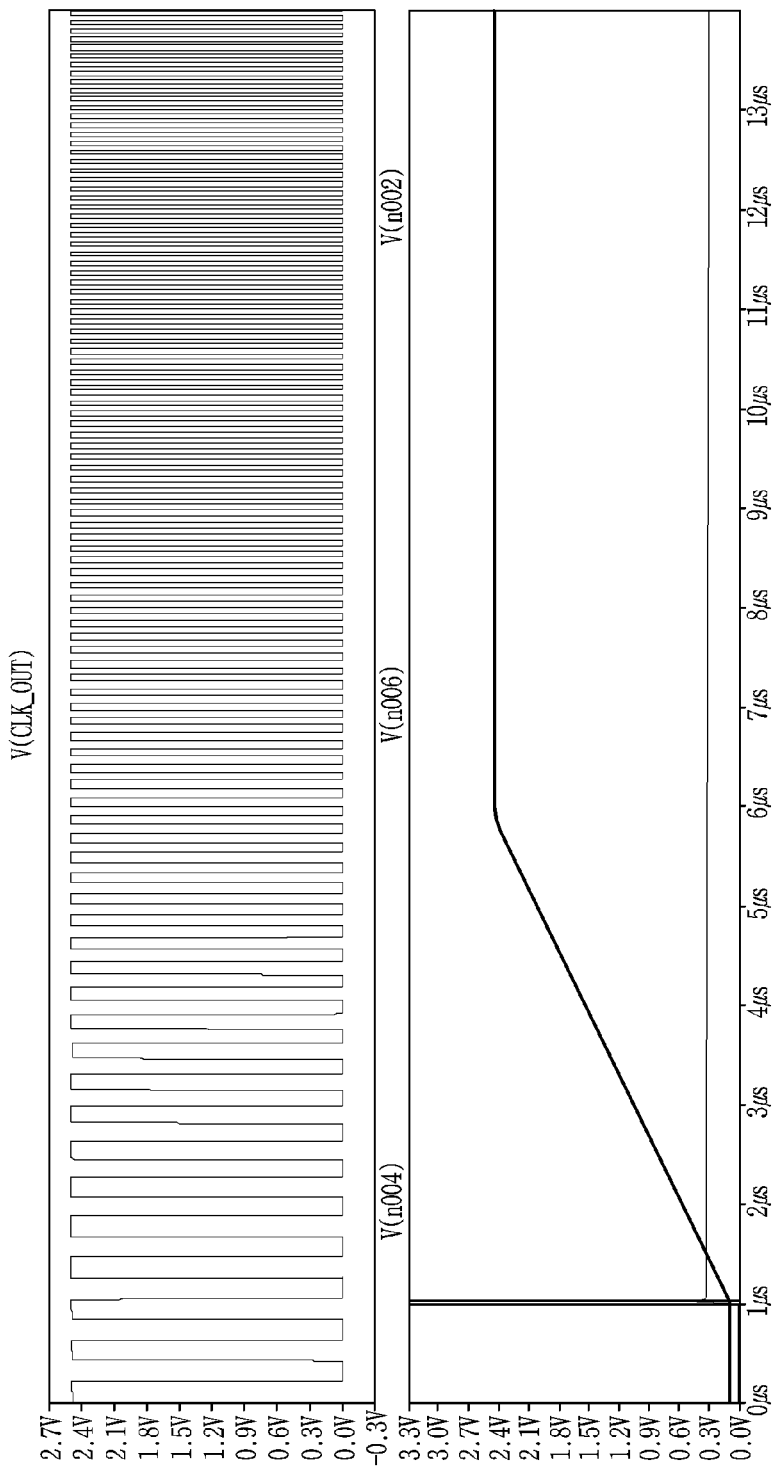
[FIG.5]

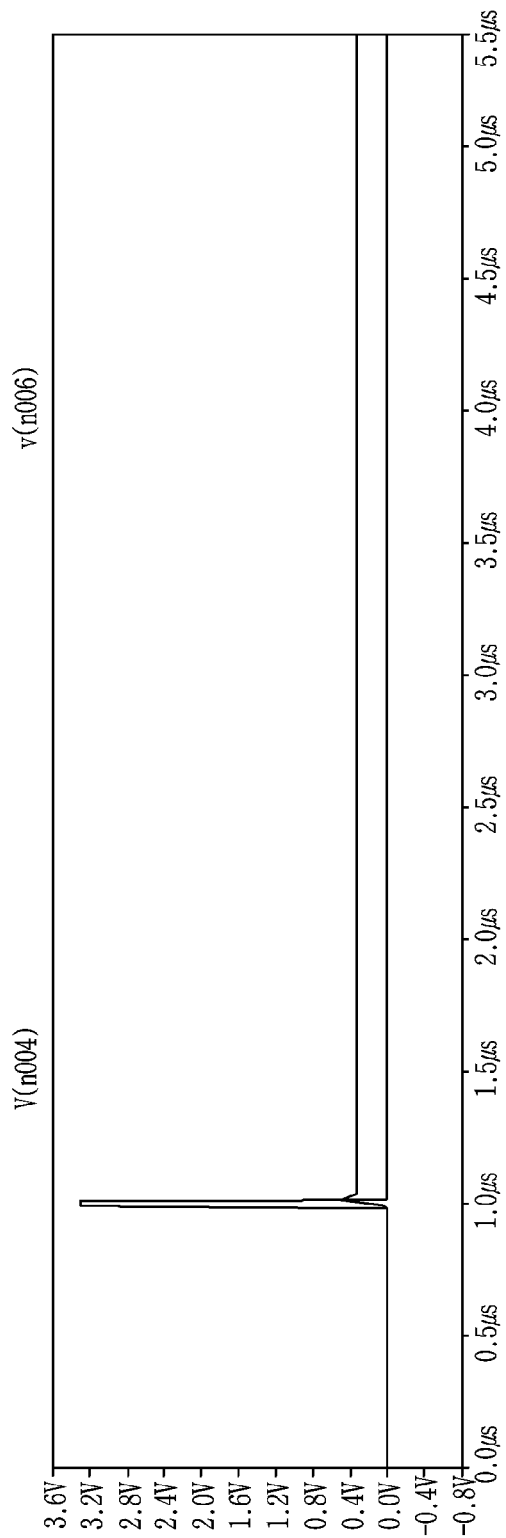
[FIG.6]

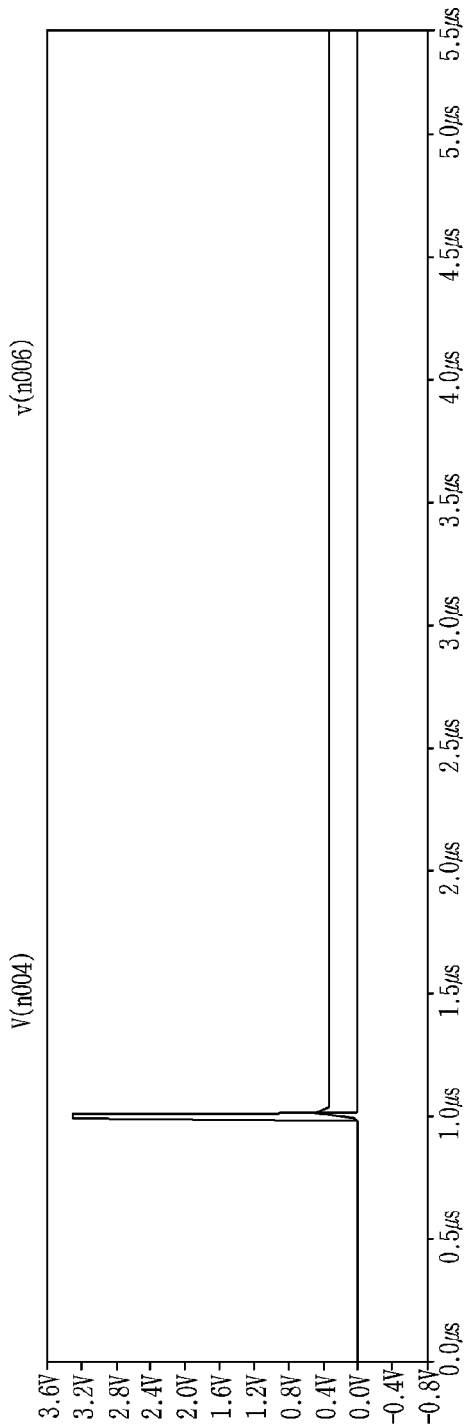
[FIG.7]

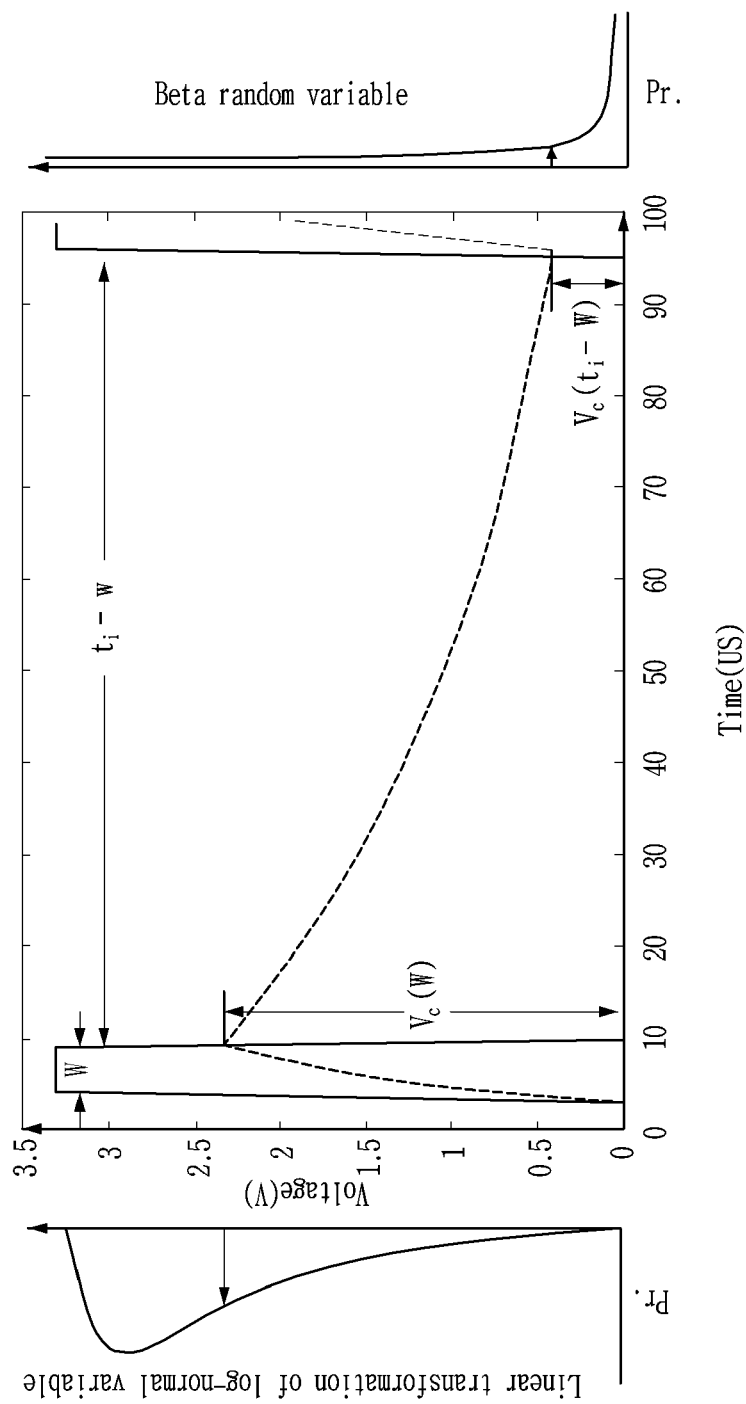
[FIG.8]

RANDOM NUMBER GENERATOR FOR DEFENDING AGAINST SUBCHANNEL ATTACK, AND OPERATION METHOD THEREOF

FIELD

The present disclosure relates to a random number generator for defending against a side-channel attack and a method for operating the generator and more particularly, to a random number generator capable of defending against a side-channel attack using a random frequency generated based on an entropy source of a true random number generator and a method for operating the generator.

BACKGROUND

A random number generator plays an important role in generating random numbers for encryption keys, initialization values, and side-channel defense in security chips. A high entropy source is needed to generate random numbers, one example of which is a quantum entropy source based on the decay of radioisotopes. However, most entropy sources have a bias, which may require post-processing to alleviate the bias effect and may use a deterministic random number generator to increase the value of random numbers. Also, most entropy sources take physical measurements of the natural environment to produce pulses in proportion to the magnitude of the energy in the measurements; therefore, final output pulses of the entropy source are characterized by their unpredictable period. Suppose pulses with a non-deterministic period are used to generate high-speed random frequencies; then, it may make it difficult to predict a particular instruction within a uniform set of frequencies, which is one of the side-channel attack methods typically used by hackers.

A related prior art is Korean registered patent No. 10-1721168, "Method of operating random pulse generator apparatus using radioisotope."

SUMMARY

An object of the present disclosure is to provide a random number generator resistant to side-channel attacks from hackers, which generates a random frequency based on an unpredictable entropy source and inputs the random frequency when a microprocessor executes a specific instruction.

A random number generator resistant to side-channel attacks according to one embodiment of the present disclosure comprises an entropy unit generating random pulses, a random frequency clock generator generating random frequencies by receiving random pulses output from the entropy unit, and an MCU externally masking a specific operation or a specific instruction based on a random frequency received from the random frequency clock generator.

A method for operating a random frequency clock generator resistant to side-channel attacks according to one embodiment of the present disclosure comprises generating random pulses by an entropy unit, generating random frequencies by receiving random pulses output from the entropy unit, and masking a specific instruction externally by an MCU based on a random frequency received from the random frequency clock generator.

The present disclosure provides an effect of making a hacker's side-channel attack difficult by entering a random frequency to the MCU at the time of operating a specific instruction and disturbing the time at which a target operation is executed.

Also, the present disclosure provides a random number generator using radioisotopes capable of generating random numbers at a high rate through a deterministic random number generator.

Also, the present disclosure may be used to implement hiding and masking techniques through a random frequency clock and random numbers, which are countermeasures against side-channel attacks.

BRIEF DESCRIPTION OF THE DRAWINGS

FIG. 1 illustrates a structure of a random number generator resistant to side-channel attacks according to an embodiment of the present disclosure.

FIG. 2 illustrates a structure of an entropy unit according to an embodiment of the present disclosure.

FIG. 3 illustrates a structure of a random frequency clock generator according to an embodiment of the present disclosure.

FIG. 4 illustrates a simulation result of a random frequency clock generator according to an embodiment of the present disclosure.

FIGS. 5 to 8 illustrate simulation results for varying pulse widths according to an embodiment of the present disclosure.

DETAILED DESCRIPTION

Specific structural or functional descriptions of embodiments according to the concept of the present disclosure described herein are illustrated solely for the purpose of describing embodiments according to the concept of the present disclosure, and embodiments according to the concept of the present disclosure may be embodied in various forms and are not limited to the embodiments described herein.

Since the embodiments based on the concept of the present disclosure may be modified in various ways and may have various other forms, the embodiments will be illustrated in the appended drawings of the present disclosure and described in detail with reference to the drawings. However, it should be understood that the embodiments of the present disclosure are not limited to specific disclosed forms; instead, the embodiments include all of the modifications, equivalents, or substitutes belonging to the technical principles and scope of the present disclosure.

Terms used in the present disclosure are intended only for describing a specific embodiment and are not intended to limit the technical scope of the present disclosure. A singular expression should be understood to indicate a plural expression unless otherwise explicitly stated. The term "include" or "have" is used to indicate existence of an embodied feature, number, step, operation, element, component, or a combination thereof; and should not be understood to preclude the existence or possibility of adding one or more other features, numbers, steps, operations, elements, components, or a combination thereof.

In what follows, embodiments of the present disclosure will be described in detail with reference to appended drawings.

FIG. 1 illustrates a structure of a random number generator resistant to side-channel attacks according to an embodiment of the present disclosure.

Referring to FIG. 1, a random number generator resistant to side-channel attacks comprises an entropy unit 100, a random frequency clock generator 200, a first selector 300, an MCU 400, a counter 500, a random number generating unit 600, and a second selector 700.

The entropy unit 100 generates random pulses having a pulse width determined randomly by alpha particles emitted during the natural decay of radioisotopes. The entropy unit 100 may include a radioisotope emitter and detector, and the pulse width of a random pulse may be determined in proportion to the amount of energy generated due to the collision of one or more alpha particles released from the radioisotope emitter with the radioisotope detector. In other words, pulses with a random pulse width may be generated based on different amounts of energy generated when one or more alpha particles having different amounts of energy collide with the detector or one or more alpha particles having the same amount of energy collide with the detector. The pulse width of random pulses generated by the entropy unit 100 may be a value obtained by multiplying the number of random alpha particles colliding with the detector by the amount of energy of each particle.

The random frequency clock generator 200 receives random pulses output from the entropy unit 100 to generate a random frequency. The random frequency clock generator 200 includes an AMP 210 and a Voltage Controlled Oscillator (VCO) 220. The random frequency clock generator 200 may generate a random frequency based on the pulse signal width of the random pulse and the time difference between the pulse signals. In other words, the random frequency clock generator 200 may generate a frequency as the number of charges accumulated in the capacitor varies according to the width of a random pulse, the initial frequency output to the VCO 220 is changed, and the frequency is decreased in proportion to the number of charges discharged from the capacitor until the next pulse is generated.

The first selector 300 selectively receives a random frequency output from the random frequency clock generator 200 and the reference clock CLK based on a first selection signal sel0 and outputs the selected signal to the random number generating unit 600.

The MCU 400 may be configured by firmware to control the first selection signal sel0 of the first selector and a second selection signal sel1 of the second selector. The MCU 400 may enable the first selection signal of the first selector for external masking when a specific operation or a specific instruction is executed and may receive a random frequency output from the random frequency clock generator 200 to execute a specific operation or a specific instruction. In other words, if the MCU 400 executes a specific instruction when the duty cycle is fixed, a hacker may easily make a side-channel attack; however, when the timing is varied by a random frequency, the hacker may not make the side-channel attack since it is not possible to know whether the MCU executes an instruction.

The counter 500 receives random pulses output from the entropy unit 100 and outputs a random number seed. The counter 500 may generate a random number by measuring the time between the random pulses. The counter 500 may provide the generated random number to the random number generating unit 500 so that the provided random number is used as a seed for generating random numbers.

The random number generating unit 600 may be a deterministic random bit generator (DRBG). The present disclosure employs the AES-CTR DRBG approved by NIST. However, the present disclosure is not limited to the specific selection and may employ a different hash function or HMAC-DRBG.

The second selector 700 outputs at least one of the random number output from the random number generating unit 600 and the random number output from the counter 500 based on the second selection signal sel1.

In other words, the random frequency output from the random frequency clock generator 200 may be used to implement a hiding technique, which is a countermeasure against the side-channel attack, while the random number output from the second selector may be used to implement a masking technique, which is a countermeasure against the side-channel attack.

FIG. 2 illustrates a structure of an entropy unit according to an embodiment of the present disclosure.

Referring to FIG. 2, the entropy unit 100 comprises a photodiode for detecting alpha particles, an amplifier, and a comparator. Alpha particles may be detected by a CMOS-type photodiode (PD), where the reverse bias leakage current of the PD is less than 1 nA, and a photocurrent of 1 μA may be typically generated when the alpha particles are absorbed in the depletion region of the PD. The amplifier may be a transimpedance amplifier (TIA), which may amplify and detect a very low-level current due to the absorption of alpha particles and may perform amplification in two steps. The transimpedance gain and unity-gain bandwidth of a first TIA may be 10 MΩ and 10 MHz, respectively, and the gain of a second TIA may be set to 10. The comparator may have a reference voltage of 0.3 V and convert the amplified voltage from the transimpedance amplifier (TIA) to the analog pulse signal $V_{O\_COMP}$, called random pulses.

$$V_{O\_COMP} = \begin{cases} 1 & \text{if } V_{O\_TIA} \leq V_{REF3} \\ 0 & \text{if } V_{O\_TIA} > V_{REF3}. \end{cases}$$

In other words, the entropy unit 100 finally generates a random pulse when alpha particles caused by the radioisotope decay are detected.

FIG. 3 illustrates a structure of a random frequency clock generator according to an embodiment of the present disclosure.

Referring to FIG. 3, a structure of a random frequency clock generator is illustrated. V1 represents the analog pulse of the entropy unit and is connected to a low-pass filter consisting of a register R2, a capacitor C1, and a switching diode D1. During the positive pulse period, the capacitor C1 may be charged with a time constant τ1=R2·C1 and may be discharged with a time constant τ2=(R1+R5)·C1 until the next positive pulse is generated. A non-inverting amplifier may be used to amplify the charging voltage of the capacitor C1 by the entropy unit 100.

FIG. 4 illustrates a simulation result of a random frequency clock generator according to an embodiment of the present disclosure.

Referring to FIG. 4, the waveform of an analog pulse signal of the entropy unit 100, the voltage of C1, and the clock frequency changed by the amplified voltage and the amplified current are illustrated. The width of a positive pulse and the width of a negative pulse may determine the frequency range of the clock during two successive pulses.

FIGS. 5 to 8 illustrate simulation results for varying pulse widths according to an embodiment of the present disclosure. FIG. 5 illustrates a 2.4 V charge voltage of a clock generated by the pulses having a pulse width of 200 ns, and FIG. 6 illustrates the FFT result of the clock generated by the pulses having a pulse width of 200 ns. FIG. 7 illustrates a 0.4 V charge voltage of a clock generated by the pulses having a pulse width of 20 ns, and FIG. 8 illustrates the FFT result of the clock generated by the pulses having a pulse width of 20 ns. In other words, the figures show the charge voltages of clocks generated due to two different random pulse widths (200 ns and 20 ns), which determine the frequency range of the generated clocks and FFT results of the clocks, where the base frequency of the generated clock may become smaller as the charged voltage gets smaller.

The present disclosure has been described with reference to the embodiments illustrated in the appended drawings. However, the descriptions relate only to illustrative examples, and it should be clearly understood by those skilled in the art to which the present disclosure belongs that various modifications of the embodiments and other equivalent embodiments may be implemented from the descriptions. Therefore, the actual scope of technical protection of the present disclosure should be determined by the technical spirit and principles defined by the appended claims.

What is claimed is:

1. A random number generator resistant to side-channel attacks, the random number generator comprising:
   an entropy unit generating random pulses;
   a random frequency clock generator generating random frequencies by receiving random pulses output from the entropy unit; and
   a microcontroller unit (MCU) externally masking a predetermined operation or a predetermined instruction based on a random frequency received from the random frequency clock generator,
   wherein
   when the predetermined operation or the predetermined instruction is not executed, the MCU selectively receives a reference clock, and
   when the predetermined operation or the predetermined instruction is executed, the MCU selectively receives the random frequency from the random frequency clock generator in order to externally hide the predetermined operation or the predetermined instruction.

2. The random number generator of claim 1, further including:
   a first selector selectively outputting the random frequency output from the random frequency clock generator and the reference clock to the MCU according to a first selection signal.

3. The random number generator of claim 2, further including:
   a counter outputting a first random number based on a random pulse output from the entropy unit.

4. The random number generator of claim 3, further including:
   a second selector selectively outputting one of a random number output from a second random bit generator and the first random number output from the counter according to a second selection signal.

5. A method for operating a random frequency clock generator resistant to side-channel attacks, the method comprising:
   (a) generating random pulses by an entropy unit;
   (b) generating random frequencies by receiving random pulses output from the entropy unit; and
   (c) masking a predetermined instruction externally by a microcontroller unit (MCU) based on a random frequency received from the random frequency clock generator,
   wherein
   when the predetermined instruction is not executed, the MCU selectively receives a reference clock, and
   when the predetermined instruction is executed, the MCU selectively receives the random frequency from the random frequency clock generator in order to externally hide the predetermined operation or the predetermined instruction.

6. The random number generator of claim 1, wherein the random frequency output from the random frequency clock generator is used to implement a hiding technique, which is a countermeasure against a side-channel attack.

7. The random number generator of claim 4, wherein the random number output from the second selector is used to implement a masking technique, which is a countermeasure against a side-channel attack.

8. A random number generator resistant to side-channel attacks, the random number generator comprising:
   an entropy unit generating random pulses;
   a random frequency clock generator generating random frequencies by receiving random pulses output from the entropy unit;
   a microcontroller unit (MCU) externally masking a predetermined operation or a predetermined instruction based on a random frequency received from the random frequency clock generator;
   a first selector selectively outputting the random frequency output from the random frequency clock generator and a reference clock to the MCU according to a first selection signal;
   a counter outputting a first random number based on a random pulse output from the entropy unit; and
   a second selector selectively outputting one of a random number output from a second random bit generator and the first random number output from the counter according to a second selection signal,
   wherein
   the random frequency output from the random frequency clock generator is used to implement a hiding technique, which is a countermeasure against a side-channel attack, and
   the random number output from the second selector is used to implement a masking technique, which is a countermeasure against a side-channel attack.

\* \* \* \* \*